(12) United States Patent
Terrier

(10) Patent No.: US 11,261,365 B2
(45) Date of Patent: Mar. 1, 2022

(54) METHODS FOR CEMENTING THERMAL WELLS

(71) Applicant: Schlumberger Technology Corporation, Sugar Land, TX (US)

(72) Inventor: Cyril Terrier, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 16/190,904

(22) Filed: Nov. 14, 2018

(65) Prior Publication Data
US 2019/0144734 A1    May 16, 2019

(30) Foreign Application Priority Data
Nov. 14, 2017  (EP) ................................. 17306572

(51) Int. Cl.
| E21B 33/14 | (2006.01) |
| C09K 8/467 | (2006.01) |
| C09K 8/48  | (2006.01) |
| C09K 8/46  | (2006.01) |
| C04B 28/18 | (2006.01) |
| C04B 28/04 | (2006.01) |

(Continued)

(52) U.S. Cl.
CPC ............... *C09K 8/467* (2013.01); *C04B 7/02* (2013.01); *C04B 14/04* (2013.01); *C04B 14/303* (2013.01); *C04B 14/304* (2013.01); *C04B 14/368* (2013.01); *C04B 18/08* (2013.01); *C04B 28/04* (2013.01); *C04B 28/18* (2013.01); *C09K 8/46* (2013.01); *C09K 8/473* (2013.01); *C09K 8/48* (2013.01); *E21B 33/14* (2013.01); *C04B 2111/00155* (2013.01); *C04B 2111/00215* (2013.01)

(58) Field of Classification Search
CPC ............ C09K 8/467; C09K 8/48; E21B 33/14
USPC ............................................... 166/293
See application file for complete search history.

(56) References Cited

U.S. PATENT DOCUMENTS

| 6,143,069 A * | 11/2000 | Brothers | ............... C04B 28/06 106/678 |
| 2007/0089880 A1* | 4/2007 | Roddy | ............... C09K 8/467 166/293 |

(Continued)

FOREIGN PATENT DOCUMENTS

| GB | 2387613 A | 10/2003 |
| RU | 2161695 C2 | 1/2001 |
| WO | 9901397 A1 | 1/1999 |
| WO | 2016005610 A1 | 1/2016 |

OTHER PUBLICATIONS

Caritey et al., "Performance of thermal cements with weighting materials", SPE/IADC 163544, SPE/IADC Drilling Conference and Exhibition, Mar. 5-7, 2013, 9 pages.

(Continued)

*Primary Examiner* — Zakiya W Bates
*Assistant Examiner* — Ashish K Varma

(57) ABSTRACT

Portland cement compositions for use in high-temperature, high pressure wells are designed such that the lime-to-silica molar ratio is between 0.5 and 1.0, and the alumina-to-silica molar ratio is between 0.05 and 0.10. After curing and setting at temperatures between 85° C. and 300° C., the cement compositions form tobermorite as an initial and permanent calcium silicate hydrate phase.

15 Claims, 5 Drawing Sheets

(51) Int. Cl.

| | |
|---|---|
| *C04B 7/02* | (2006.01) |
| *C04B 14/04* | (2006.01) |
| *C04B 14/30* | (2006.01) |
| *C04B 14/36* | (2006.01) |
| *C04B 18/08* | (2006.01) |
| *C09K 8/473* | (2006.01) |
| *C04B 111/00* | (2006.01) |

(56) References Cited

U.S. PATENT DOCUMENTS

| | | | | |
|---|---|---|---|---|
| 2009/0095475 | A1* | 4/2009 | Ravi | ............... C04B 28/04 |
| | | | | 166/293 |
| 2011/0162845 | A1* | 7/2011 | Ravi | ............... C04B 28/08 |
| | | | | 166/293 |
| 2012/0152539 | A1* | 6/2012 | Karcher | ............. C09K 8/46 |
| | | | | 166/293 |
| 2014/0116150 | A1* | 5/2014 | Morgan | ............ C04B 18/162 |
| | | | | 73/818 |

OTHER PUBLICATIONS

Lothenbach, "Calcium silicate hydrates: Solid and liquid phase composition", Cement and Concrete Composites, 78, pp. 57-70.
Luke, "Phase studies of pozzolanic stabilized calcium silicate hydrates at 180° C.", Cement and Concrete Research, vol. 34, 2004, pp. 1725-1732.
Kalousek et al., "Research on cements for geothermal and deep oil wells", SPE 5940, Dec. 1974, pp. 307-309.
Extended Search Report issued in European Patent Appl. No. 17306572.3 dated May 16, 2018; 6 pages.
Alp et al., "Utilization of Supplementary Cementitious Materials in Geothermal Well Cementing", Applied Thermal Engineering, Feb. 13, 2013, 7 pages.
Nelson, "Thermal Cements", Developments in Petroleum Science, Jan. 1, 1990, vol. 28, pp. 9-1 thru 9-19.
Nelson EB, Michaux M and Drochon B: "Cement Additives and Mechanisms of Action," in Nelson EB and Guillot D (eds.): Well Cementing (2nd Edition), Schlumberger, Houston (2006) 49-91.

* cited by examiner

METHODS FOR CEMENTING THERMAL WELLS

BACKGROUND

The present application claims priority to European Procedure Application Filing No. 17306572.3 filed Nov. 14, 2017, which is incorporated herein by reference in its entirety.

The statements in this section merely provide background information related to the present disclosure and may not constitute prior art.

This disclosure relates to compositions and methods for cementing high-temperature, high-pressure (HPHT) wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole prevents leaks.

Portland cement is employed to cement the vast majority of subterranean wells. Achieving optimal cement-slurry placement and set-cement properties depends on the incorporation of one or more additives that modify the chemical and/or physical behavior of the slurry. A plethora of additives exist that fall into several categories, including accelerators, retarders, dispersants, fluid-loss additives, extenders, pozzolans, weighting agents, swellable materials, gas-generating materials and antifoam agents. An extensive discussion concerning additives for well cements may be found in the following publication. Nelson E B, Michaux M and Drochon B: "Cement Additives and Mechanisms of Action," in Nelson E B and Guillot D (eds.): Well Cementing (2nd Edition), Schlumberger, Houston (2006) 49-91, which is incorporated by reference in its entirety (in jurisdictions where allowed).

Designing cement slurries for HPHT wells is particularly challenging. Generally speaking HPHT wells begin when the bottomhole temperature exceeds about 150° C. (300° F.) and the bottomhole pressure exceeds about 69 MPa (10,000 psi). HPHT cementing encompasses three principal types of wells: deep oil and gas wells, geothermal wells, and thermal recovery wells. In most cases, portland cement is used to secure the well casing and provide zonal isolation.

The physical and chemical behavior of well cements changes at elevated temperatures and pressures, and is also influenced by the chemical and physical properties of the formations in contact with the cement. Corrosive water zones and very weak formations are not uncommon in HPHT wells. Without careful slurry design, the integrity of the set cement may deteriorate, potentially resulting in the loss of zonal isolation.

A complex array of additives—including retarders, dispersants, fluid-loss additives and silica stabilizers—may be present to obtain a slurry that operators can successfully place in the well, and a set cement that will provide casing support and zonal isolation throughout the life of the well.

A special chemical notation established by cement chemists is frequently used in this application. The chemical formulas of many cement compounds can be expressed as a sum of oxides; for example, tricalcium silicate, $Ca_3SiO_5$, can be written as $3CaO.SiO_2$. Abbreviations are given for the oxides most frequently encountered, such as C for CaO (lime), S for $SiO_2$ (silica) and A for $Al_2O_3$ (alumina). Thus $Ca_3SiO_5$ becomes $C_3S$. A list of abbreviations is given below.

| | | | |
|---|---|---|---|
| C = CaO | F = $Fe_2O_3$ | N = $Na_2O$ | P = $P_2O_5$ |
| A = $Al_2O_3$ | M = MgO | K = $K_2O$ | f = FeO |
| S = $SiO_2$ | H = $H_2O$ | L = $Li_2O$ | T = $TiO_2$ |

Others are sometimes used, such as $\bar{S}=SO_3$ and $\bar{C}=CO_2$. This convention of using a shortened notation was adopted as a simple method for describing compounds whose complete molecular formulas occupy much space when written.

Portland cement is substantially a calcium silicate material, the most abundant components being tricalcium silicate ($C_3S$) and dicalcium silicate ($C_2S$). Upon addition of water, both hydrate to form a gelatinous calcium silicate hydrate called "C—S—H gel," which is responsible for the strength and dimensional stability of the set cement at ordinary temperatures. The reaction also liberates a substantial amount of calcium hydroxide.

C—S—H gel is the early hydration product even at elevated temperatures and pressures, and is an excellent binding material at well temperatures less than about 230° F. [110° C.]. At higher temperatures, C—S—H gel is subject to metamorphism, which may result in decreased compressive strength and increased permeability of the set cement. In the petroleum literature, this phenomenon is called "strength retrogression."

At temperatures above about 230° F. [110° C.], C—S—H gel often converts to a phase called alpha dicalcium silicate hydrate ($\alpha$-$C_2$SH). $\alpha$-$C_2$SH is highly crystalline and much more dense than C—S—H gel. As a result, matrix shrinkage occurs that can be deleterious to the set-cement integrity. This effect is illustrated in FIG. 1, which depicts the compressive-strength and water-permeability behavior of conventional Portland cement systems cured at 446° F. [230° C.]. Loss of compressive strength occurred within 1 month; nevertheless, the levels to which the compressive strength fell are sufficient to support casing in a well. The industry generally considers compressive strength higher than about 500 psi (3.5 MPa) to be acceptable. The real problem lies in the severe permeability increases. To prevent interzonal communication, the permeability of well cements to water should not exceed 0.1 mD. Within one month, the water permeabilities of the normal-density ($\approx$15.8 lbm/gal [1,900 kg/m$^3$]) Class G systems portrayed in FIG. 1 (Curves 1 and 2) were 10 to 100 times higher than the recommended limit. The permeability of a high-density ($\approx$18.0 lbm/gal [2,160 kg/m$^3$]) Class H system (Curve 3) was barely acceptable. The deterioration of a lower-density (14.0 lbm/gal [1,680 kg/m$^3$]) extended cement (Curve 4) was much more severe.

The strength retrogression problem may be prevented by reducing the bulk lime-to-silica ratio (C/S ratio) in the cement. To accomplish this, the Portland cement is partially replaced by ground quartz, mainly as fine silica sand or silica flour. FIG. 2 depicts the conditions for the formation of various calcium silicate compounds, many of which occur geologically. The C/S ratio is plotted versus the curing temperature. C—S—H gel has a variable C/S ratio, averaging about 1.5. The conversion to $\alpha$-$C_2SH$ at 230° F. [110° C.] can be prevented by the addition of 35% to 40% silica (by weight of cement [BWOC]), reducing the C/S ratio to about 1.0. At this level, a mineral known as tobermorite ($C_5S_6H_5$) is formed; fortunately, this mineral preserves high compressive strength and low permeability. Tobermorite occurs in different forms, characterized by the location of their principal peaks on an x-ray diffraction (XRD) pattern. The most common types are 9 Å tobermorite, 11 Å tobermorite and 14 Å tobermorite. As the curing temperature increases to about 300° F. [150° C.], tobermorite normally converts to xonotlite ($C_6S_6H$) and a smaller amount of gyrolite ($C_6S_3H_2$) with minimal deterioration of cement performance. Tobermorite sometimes persists to 480° F. [250° C.] in Portland cement systems because of aluminum substitution in the lattice structure, forming a mineral known as aluminum substituted tobermorite. In this application, references to tobermorite may mean include the aforementioned types. The improved performance of "silica-stabilized" Portland cements at elevated temperatures is illustrated in FIG. 3. Normal-density Class G cements, stabilized with silica sand or silica flour, were cured at 446° and 608° F. [230° and 320° C.].

At 480° F. [250° C.] the phase truscottite ($C_7S_{12}H_3$) begins to appear. As the curing temperature approaches 750° F. [400° C.], both xonotlite and truscottite are near their maximum stable temperatures, and dehydration of the residual CH to C occurs. At higher temperatures, the xonotlite and truscottite dehydrate, resulting in the disintegration of the set cement.

A thorough overview of thermal cementing may be found in the following publication. Nelson E B and Barlet-Gouédard: "Thermal Cements," in Nelson E B and Guillot D (eds.): *Well Cementing*-2nd Edition, Schlumberger, Houston (2006) 319-341, which is incorporated by reference in its entirety (in jurisdictions where allowed).

SUMMARY

The present disclosure describes improved methods for cementing HPHT wells.

In an aspect, embodiments relate to methods for cementing a subterranean well. A pumpable cement slurry is prepared that comprises water, portland cement, a source of silica and a source of alumina. The cement slurry is placed in the well and cured in the well at a temperature between 85° C. and 300° C., whereupon the cement slurry forms a set cement. The lime-to-silica molar ratio in the cement slurry is between 0.5 and 1.0, and the alumina-to-silica molar ratio is between 0.05 and 0.10.

DETAILED DESCRIPTION

Figure 1:
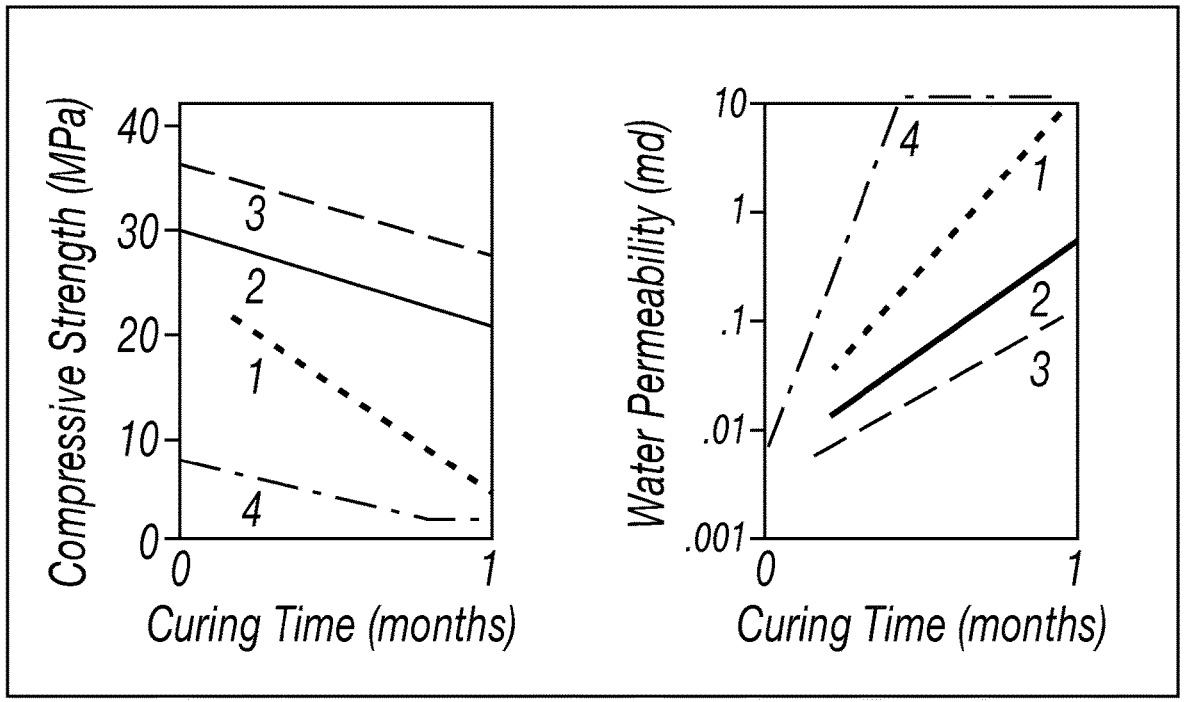
FIG. 1 shows the compressive strength and water permeability behavior of set portland cements at elevated temperatures.
Figure 2:
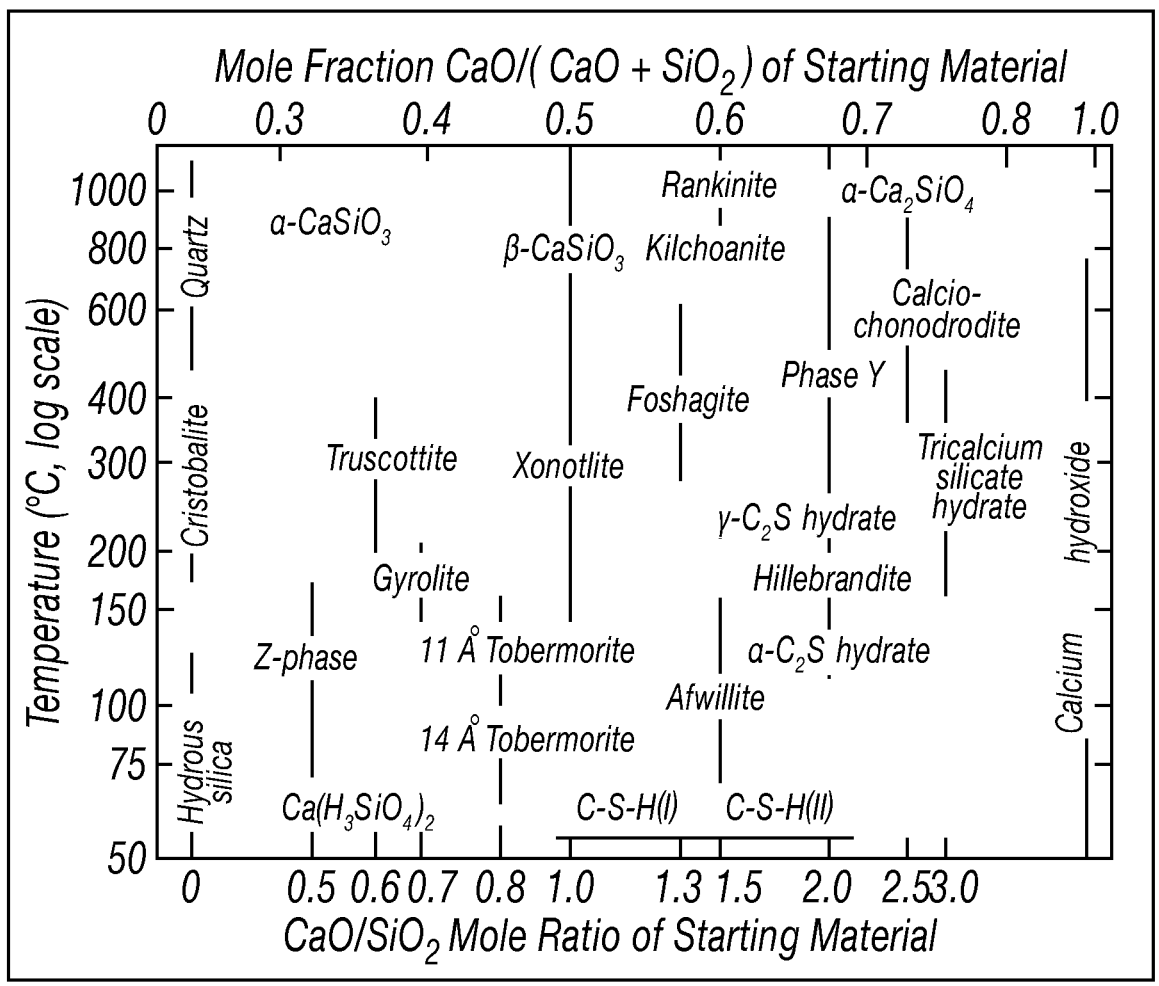
FIG. 2 is a phase diagram depicting the formation conditions for various calcium silicate hydrate minerals.
Figure 3:
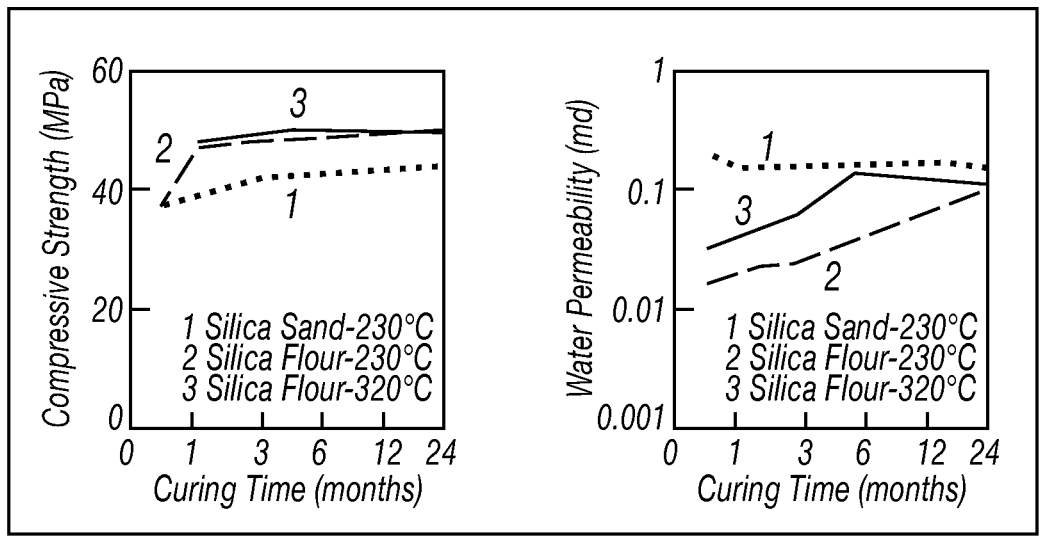
FIG. 3 shows the strength and water permeability behavior of set portland cements that have been stabilized with 35% silica by weight of cement.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

The inventors have determined that improved cements for HPHT wells may be obtained by simultaneously controlling the lime-to-silica molar ratio (C/S ratio) and the alumina-to-silica molar ratio (A/S) ratio. Doing so extends the temperature stability range of tobermorite and enhances performance in terms of mechanical properties, durability and permeability. Tobermorite may occur initially during early curing and also persist permanently. Other calcium silicate hydrate minerals may also appear along with tobermorite. Portland cement may be employed in the cement slurry design; however, other formulations that form calcium silicate hydrates are also envisioned. Such alternate formulations include lime/silica blends.

The source of silica in the cement slurries may be crystalline silica, having a median particle size ($d_{50}$) between 3.0 µm and 400 µm. The silica may be present at a concentration between 20% and 120% by weight of cement (BWOC), or between 30% and 70% BWOC, or between 40% and 60% BWOC.

The source of alumina in the cement slurries may be Type F fly ash, metakaolin, cenospheres or blast furnace slag, or combinations thereof. The alumina source may be present at a concentration between 10% and 60% BWOC, or between 20% and 40% BWOC. The alumina source may have a median particle size ($d_{50}$) between 1 µm and 100 µm.

The C/S ratio in the cement slurries may be between 0.5 and 1.0, or between 0.6 and 1.0, or between 0.8 and 1.0. The A/S ratio in the cement formulations may be between 0.05 and 0.10, or between 0.06 and 0.09.

The solid volume fraction (SVF) in the cement slurries may be between 20% and 60%, or between 30% and 45%.

The compressive strength of the set cement may exceed 3.5 MPa (500 psi) and the water permeability of the set cement may be lower than 0.1 mD. Furthermore, the compressive strength of the set cement may not vary more than 30% during a 6-month curing period at the bottomhole static temperature, or more than 20% during a 6-month curing period. The Young's modulus of the set cement may be between about 2.0 and 15 GPa.

The cement slurries may further comprise weighting materials. The weighting materials may comprise iron dust, hausmannite, ilmenite, hematite, titanium dioxide, barite or calcite, or combinations thereof.

The cement slurries may further comprise additives to lower the slurry density. Such additives may include glass microspheres, cenospheres, or nitrogen (to prepare foamed cement), or combinations thereof.

The cement slurries may further comprise additives that impart self-healing properties. Such additives are materials that swell in the presence of certain fluids that are encountered in subterranean wells. Such fluids include water, oil, natural gas, carbon dioxide and hydrogen sulfide. Should defects develop in the cement sheath or if microannuli form along the casing/cement or cement/formation interfaces, the swelling of the additives in the cement sheath seals the defects or microannuli, restoring zonal isolation. The fluids may occur naturally downhole, or may be injected into the well during a remedial operation.

The cement slurries may further comprise additives that impart flexibility to the cement sheath. Such flexibility renders the cement sheath more resistant to physical stresses associated with temperature cycles, tectonic movements of the formation and vibrations or pressure variations associated with oilfield operations that take place during the life of the well (e.g., further drilling and hydraulic fracturing).

The cement slurries may further comprise additives that adjust the linear coefficient of expansion (LCTE) of the cement sheath. Such additives improve the cement sheath's ability to withstand temperature cycles in the near-wellbore region associated with, for example, steamflooding and hydraulic fracturing operations. The additives reduce the risk of debonding between the cement sheath and the casing, the formation or both.

The additives for self-healing, flexibility and adjusted LCTE may comprise petroleum coke, delayed coke, fluid coke, calcined coke, asphalt, charcoal, coal, anthracite, graphite, flake coke, amorphous pitch coke, anode coke, metallurgical coke, amorphous graphite, lignite, bituminous coal, sub-bituminous coal, exinite, vitrinite, intertinite, fine kolite, activated carbon, gilsonite, ground rubber, an aqueous inverse emulsion of particles comprising a betaine group, poly-2, 2, 1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly (isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers or substituted styrene acrylate copolymers, or combinations thereof. These additives may be chosen according to their physical stability at the curing conditions in a particular well, avoiding the inclusion of additives that would melt.

The cement slurries may further comprise additives that impart expansive properties to the cement sheath. Expansion of the cement sheath may help prevent the formation of microannuli. The expansive additives may comprise calcium sulfate hemihydrate, calcium oxide, magnesium oxide or both.

The cement slurries may further comprise accelerators, retarders, dispersants, fluid-loss additives, gas-generating agents and antifoam agents that are known in the art.

Placement of the cement slurries may occur during a primary cementing operation. Such operations may comprise pumping the cement slurry down the casing, whereupon the slurry exits the casing the travels back toward the surface inside an annulus between the casing and the formation. Primary cementing operations may also be conducted such that the cement slurry fills an annulus between two casing strings. Primary cementing may also be conducted as a "reverse cementing" operation, during which the cement slurry is pumped down the annulus.

Placement of the cement slurries may occur during a remedial cementing operations. Such operations include squeeze cementing and plug cementing.

The foregoing is further illustrated by reference to the following examples, which are presented for purposes of illustration and are not intended to limit the scope of the present disclosure.

EXAMPLES

The following examples serve to further illustrate the disclosure. The experiments described below were performed in accordance with recommended procedures published by the American Petroleum Institute. *Recommended Practice for Testing Well Cements*, API RP 10B-2, 2nd Edition (April 2013).

For the foregoing examples, the portland cement and Type F fly ash had the following compositions (Table 1).

TABLE 1

Compositions of Type F fly ash and Class G portland cement.

| Material | Type F fly ash | API Class G cement |
|---|---|---|
| Supplier | Headwaters | Dyckerhoff |
| Specific Gravity | 2.43 | 3.19 |
| Oxide content | | |
| $SiO_2$ [wt %] | 56.03 | 22.38 |
| $Al_2O_3$ [wt %] | 19.67 | 3.39 |
| CaO [wt %] | 12.15 | 64.72 |
| $Fe_2O_3$ [wt %] | 5.36 | 5.15 |

The crystalline silica used in the examples was SIRKON M500 (d50=4 μm), available from Sibelco, Antwerp, Belgium.

Example 1

Two cement slurries were prepared with compositions as shown in Table 2.

TABLE 2

Cement compositions, curing conditions and set-cement mineral compositions.

| | Design # | |
|---|---|---|
| | [1] | [2] |
| SVF* [%] | 45.0 | 47.0 |
| Slurry Density [lbm/gal ($kg/m^3$)] | 15.86 (1,900) | 15.86 (1,900) |
| API Class G [% BWOC**] | 100.0 | 100.0 |
| API Class H [% BWOC] | — | — |
| Crystalline silica [% BWOC] | 55.2 | 50.0 |
| Type F fly ash [% BWOC] | — | 30.0 |
| C/S mole ratio*** | 0.894 | 0.821 |
| A/S mole ratio**** | 0.026 | 0.061 |
| Polyethylene Glycol Antifoam [gal/skb*****] | 0.05 | 0.05 |
| Bentonite [% BWOB] | 1.5 | 1.3 |
| Polynaphthalene Sulfonate Dispersant [gal/skb] | 0.06 | 0.06 |
| Phosphonate/Borate Retarder [gal/skb] | 1.2 | 1.2 |
| BHST† [° C.] | 200 | 200 |
| BHP†† [MPa] | 124.1 | 124.1 |
| Curing duration [d] | 21 | 27 |

TABLE 2-continued

Cement compositions, curing conditions and set-cement mineral compositions.

| | Design # | |
|---|---|---|
| | [1] | [2] |
| Cement minerals-final | Xonotlite, Traces of 11Å-Tobermorite. | Quartz, C-S-H, Al-substituted Tobermorite |

*Solid Volume Fraction;
**by weight of cement;
***lime-to-silica ratio;
****alumina-to-silica ratio;
*****gal/sack of blend;
††bottomhole static temperature;
†††bottomhole pressure Design [1] was a comparative composition that did not contain Type F fly ash. Accordingly, the A/S ratio fell outside the range claimed by Applicant. Design [2] contained Type F fly ash.

Both compositions were cured at 200° C., and the crystalline mineral compositions were analyzed by x-ray diffraction (XRD). For Design [1] the detected mineral phases were xonotlite with traces of 11 Å tobermorite. For Design [2], the detected mineral phases were quartz, C—S—H gel and aluminum-substituted tobermorite.

Figure 4:
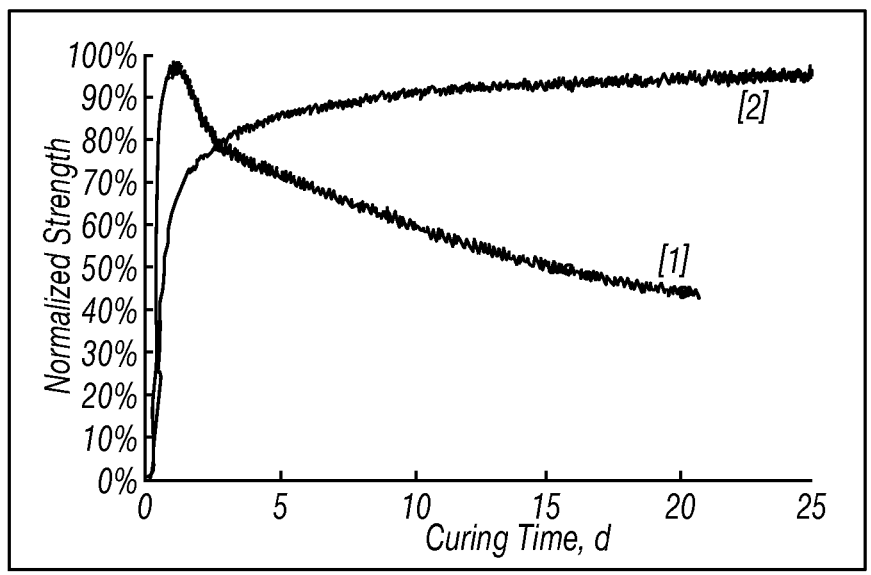
FIG. 4 shows the strength development of portland cement compositions with and without Type F fly ash, cured at 200° C.

The strength development profiles of each design were monitored with an ultrasonic cement analyzer (UCA), Model No. 4265, available from Chandler Engineering, Broken Arrow, Okla., USA. The results are shown in FIG. 4. Design [2] which contained Type F fly ash demonstrated stable strength development, while the comparative system, Design [1], demonstrated declining strength after initially reaching a maximum value.

Example 2

Six cement slurries were prepared with compositions as shown in Table 3. These slurries contained barite as a mineral filler.

Figure 5:
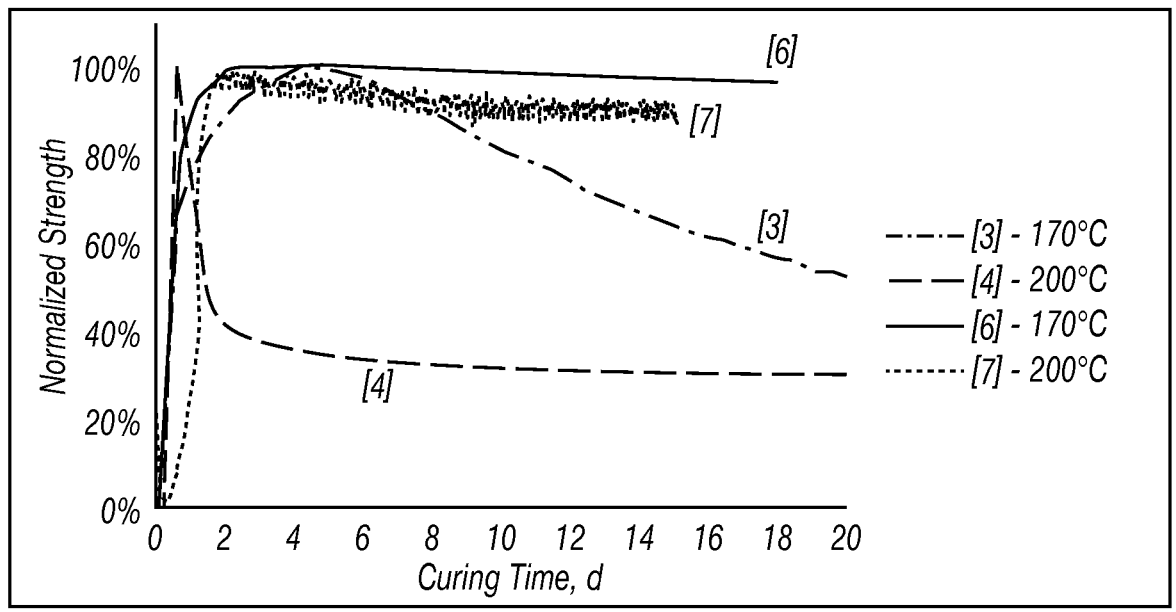
FIG. 5 shows the strength development of portland cement compositions containing barite, with and without Type F fly ash, cured at 170° C. and 200° C.

Designs [3] and [4] were identical comparative compositions that did not contain Type F fly ash. They were cured at 170° C. and 200° C. for up to 20 days. Normalized strength development of these designs is shown in FIG. 5. As the curing temperature increased, the strength development rate also increased, reaching maximum values at earlier curing times. XRD analysis revealed that C—S—H gel was the principal binding phase. At 170° C. and 200° C. the strengths decreased after reaching the maximum value, at which time tobermorite began to appear.

Figure 6:
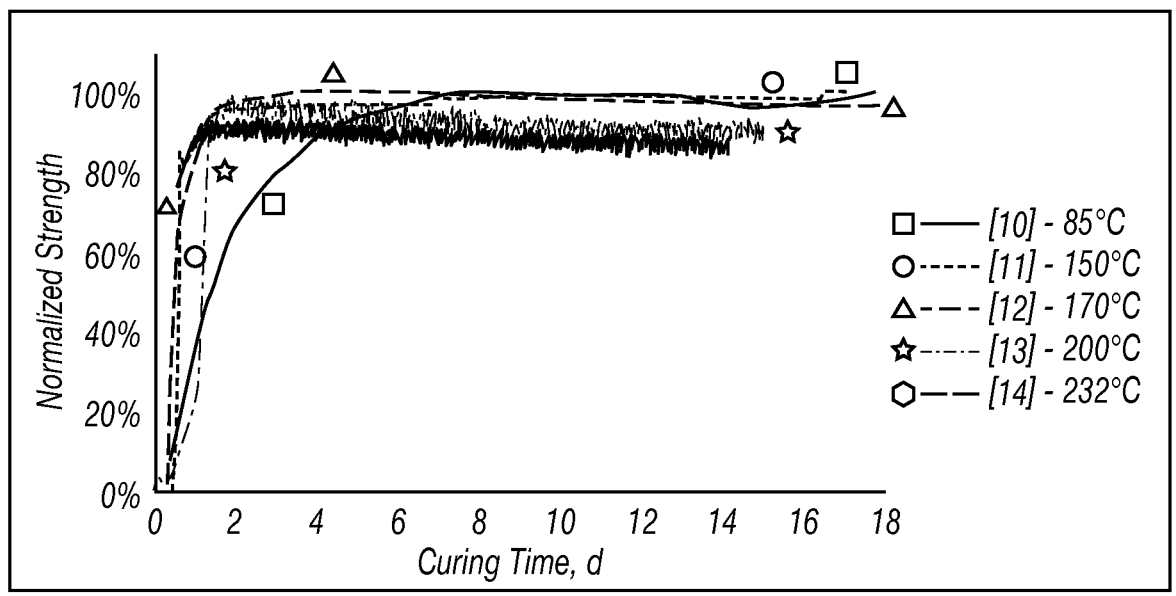
FIG. 6 shows the strength development of portland cement compositions containing barite, with and without Type F fly ash, cured at temperatures between 85° C. and 232° C.

Designs [5]-[9] were also identical compositions; however, they contained Type F fly ash at a concentration such that the A/S ratio was 0.06, within the range claimed by Applicant. They were cured at temperatures from 85° C. to 232° C. The normalized strength development data are presented in FIGS. 5 and 6. Unlike the comparative designs, Designs [5]-[8] maintained their maximum strengths during the curing period. Furthermore, XRD analysis revealed that 11 Å tobermorite was a principal binding phase in Designs [5]-[9].

TABLE 3

Cement compositions and curing conditions.

| Design # | [3] | [4] | [5] | [6] | [7] | [8] | [9] |
|---|---|---|---|---|---|---|---|
| SVF [%] | 30 | 30 | 30 | 30 | 30 | 30 | 30 |
| Slurry density [lbm/gal ($kg/m^3$)] | 14.9 (1,790) | 14.9 (1,790) | 14.7 (1,760) | 14.7 (1,760) | 14.7 (1,760) | 14.7 (1,760) | 14.7 (1,760) |
| Class G cement [% BWOC] | 100.0 | 100.0 | 100.0 | 100.0 | 100.0 | 100.0 | 100.0 |

TABLE 3-continued

Cement compositions and curing conditions.

| Design # | [3] | [4] | [5] | [6] | [7] | [8] | [9] |
|---|---|---|---|---|---|---|---|
| Crystalline silica [% BWOC] | 60.0 | 60.0 | 47.8 | 47.8 | 47.8 | 47.8 | 47.8 |
| Type F fly ash [% BWOC] | — | — | 26.8 | 26.8 | 26.8 | 26.8 | 26.8 |
| Barite [% BWOC] | 233.3 | 233.3 | 260.2 | 260.2 | 260.2 | 260.2 | 260.2 |
| Oxide ratios | | | | | | | |
| C/S mole ratio | 0.84 | 0.84 | 0.86 | 0.86 | 0.86 | 0.86 | 0.86 |
| A/S mole ratio | 0.024 | 0.024 | 0.060 | 0.060 | 0.060 | 0.060 | 0.060 |
| Curing conditions | | | | | | | |
| BHST [° C.] | 170 | 200 | 85 | 150 | 170 | 200 | 232 |
| BHP [MPa] | 20.7 | 20.7 | 20.7 | 20.7 | 20.7 | 20.7 | 20.7 |

Example 3

Five cement slurries were prepared with the compositions shown in Table 4. The compositions contained calcite, barite or hausmannite as mineral fillers. Curing was conducted at 150° C. and 20.7 MPa for up to 365 days.

TABLE 4

Cement compositions and performance.

| | Design # | | | | |
|---|---|---|---|---|---|
| | [10] | [11] | [12] | [13] | [14] |
| SVF [%] | 35 | 40 | 30 | 35 | 40 |
| Slurry Density [lbm/gal (kg/m$^3$)] | 16.3 (1,960) | 16.8 (2,020) | 12.8 (1,540) | 16.1 (1,930) | 16.5 (1,980) |
| Class G cement [% BWOC] | 100 | 100 | 100 | 100 | 100 |
| Crystalline silica [% BWOC] | 59.2 | 59.2 | 49.7 | 49.7 | 49.7 |
| Type F fly ash [% BWOC] | — | — | 30.4 | 30.4 | 30.4 |
| Calcite [% BWOC] | — | — | 112.5 | — | — |
| Barite [% BWOC] | — | 150.0 | — | — | 175.0 |
| Hausmannite [% BWOC] | 172.1 | — | — | 200.8 | — |
| Oxide ratios | | | | | |
| C/S mole ratio | 0.850 | 0.850 | 0.823 | 0.823 | 0.823 |
| A/S mole ratio | 0.024 | 0.024 | 0.062 | 0.062 | 0.062 |
| Early curing | | | | | |
| Curing time [d] | 30 | 11 | 5 | 5 | 5 |
| Hydrated cement composition | H., Q., C-S-H | B., Q., C-S-H | C., Q., T. | H., Q., T. | B., Q., T. |
| Water permeability [μD] | <7 | — | 18 | <7 | <7 |
| Unconfined compressive strength [MPa] | 22.5 | 20.4 | 5.3 | 14.4 | 15.4 |
| 3 months curing | | | | | |
| Hydrated cement composition | — | B., Q., T. (traces) | C., Q., T. | H., Q., T. | B., Q., T. |
| Water permeability [μD] | — | — | 20 | <7 | <7 |
| Unconfined compressive strength [MPa] | — | 23.6 | 4.8 | 14.8 | 20.8 |
| 6 months curing | | | | | |
| Hydrated cement composition | H., Q., C-S-H | B., Q., T. | C., Q., T. | H., Q., T. | B., Q., T. |
| Water permeability [μD] | <7 | <7 | 33 | 13 | 8 |
| Unconfined compressive strength [MPa] | 19.5 | 15.4 | 5.3 | 13.5 | 17.7 |

TABLE 4-continued

Cement compositions and performance.

| | Design # | | | | |
|---|---|---|---|---|---|
| | [10] | [11] | [12] | [13] | [14] |
| | 12 months curing | | | | |
| Hydrated cement composition | H., Q., C-S-H | B., Q., T. | C., Q., T. | H., Q., T. | B., Q., T. |
| Water permeability [μD] | <7 | <7 | 31 | 29 | 15 |
| Unconfined compressive strength [MPa] | 13.3 | 8.9 | 4.8 | 9.3 | 9.8 |

C. = Calcite,
B. = Barite,
H. = Hausmannite,
Q. = Quartz,
T. = 11Å-Tobermorite

Designs [10] and [11] were comparative compositions that did not contain Type F fly ash and whose A/S ratios were outside the range claimed by Applicant. Initially tobermorite was not one of the crystalline phases detected by XRD; however, for Design [10], tobermorite appeared at longer curing times.

Comparative Design [10] and Design [13] were counterparts in that they contained the same weighting agent (hausmannite). Design [10] suffered a 15% strength loss between 1 month to 6 months, and a 47% strength loss between 6 months and 12 months. On the other hand, the strength of Design [13] was 8% lower after curing for 6 months.

Comparative Design [11] and Design [14] were also counterparts in that they both contained barite. Design [11] suffered a 25% strength loss during 6 months' curing, and an additional 42% strength loss between 6 months and 12 months. On the other hand, Design [14] gained 15% strength during 6 months' curing.

Design [12] containing Type F fly ash was stable, with an unchanged strength during 6 months' curing.

XRD analysis revealed that C—S—H gel was the initial binding phase in Comparative Designs [10] and [11]. Tobermorite appeared at later curing times. On the other hand 11 Å tobermorite formed without being preceded by C—S—H gel in Designs [12]-[14]. Without wishing to be held to any particular theory, the data show that strength stability is enhanced when tobermorite appears as an initial binding phase during early curing periods.

For all designs, the water permeability remained lower than 0.1 mD (100 μD).

Example 4

Two cement slurries were prepared with compositions as shown in Table 5.

TABLE 5

Cement compositions, curing conditions, performance and mineral compositions.

| | Design # | |
|---|---|---|
| | [15] | [16] |
| SVF [%] | 60 | 60 |
| Slurry Density [lbm/gal (kg/m³)] | 19.3 (2.312) | 19.9 (2.384) |
| API class G [% BVOB] | 35 | 28 |

TABLE 5-continued

Cement compositions, curing conditions, performance and mineral compositions.

| | Design # | |
|---|---|---|
| | [15] | [16] |
| Coarse crystalline silica [% BVOB] | 40 | 26 |
| Fine crystalline silica [% BVOB] | 10 | 3 |
| Type F fly ash [% BVOB] | — | 19 |
| Coarse hematite [% BVOB] | 5 | 8 |
| Fine hausmannite [% BVOB] | 10 | 16 |
| Oxide ratios | | |
| Silica [% BWOC] | 118.3 | 88.5 |
| Type F fly ash [% BWOC] | 0 | 51.5 |
| C/S mole ratio | 0.493 | 0.554 |
| A/S mole ratio | 0.014 | 0.059 |
| Set cement properties (Crush of UCA HT cores) | | |
| Curing time [days] | 20 | 20 |
| BHST [° C.] | 300 | 300 |
| BHP [MPa] | 124.1 | 124.1 |
| Unconfined compressive strength [MPa] | 20.6 | 35.3 |
| Water permeability [mD] | 0.77 | 0.032 |
| Mineral composition of the cured cements | | |
| Initial products | Quartz | + | + |
| | Barite | − | − |
| | Hausmannite | + | + |
| | Hematite | + | + |
| Hydration products | 11Å-Tobermorite | − | + |
| | Xonotlite | + | − |
| | Anorthite | − | Tr. |
| | Wairakite | − | Tr. |
| | Johannsenite | ++ | ++ |
| | Bustamite | − | ++ |

(Symbols: − [not present]; Tr [trace]; + [present]; ++ [present in abundance]

Figure 7:
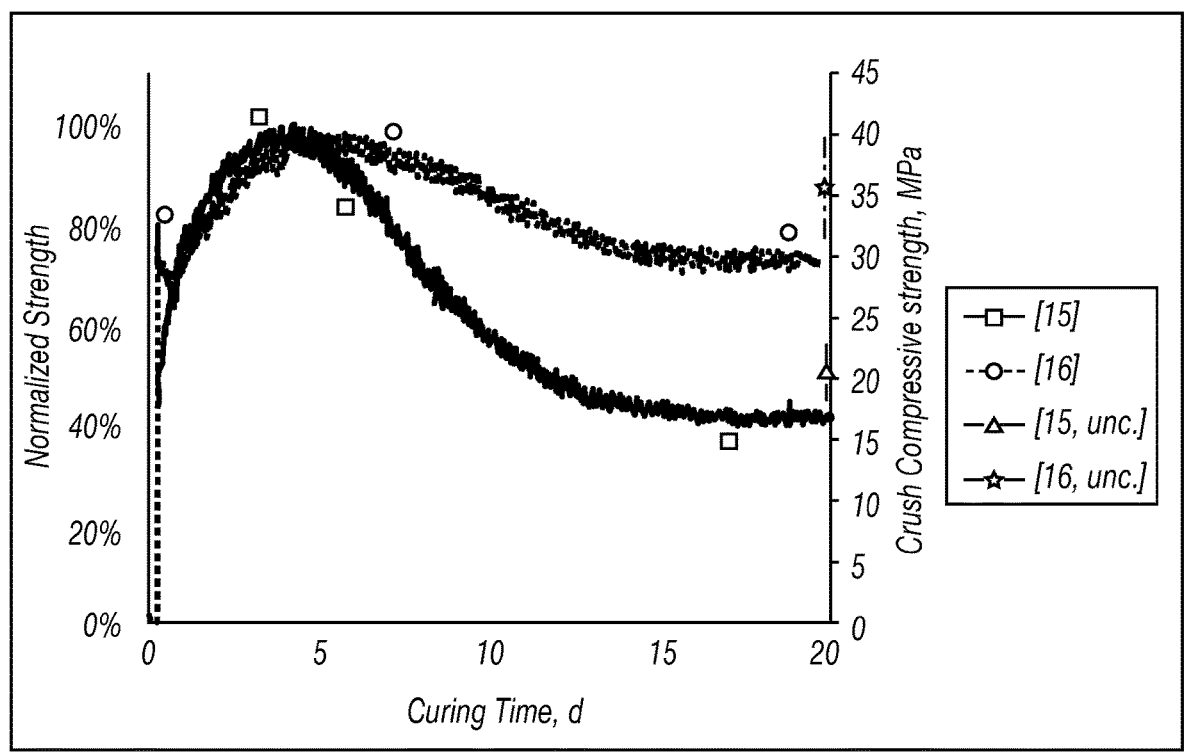
FIG. 7 shows the strength development of portland cement compositions with trimodal particle size distributions, with and without Type F fly ash, cured at 300° C.

Designs [15] and [16] are examples of DensCRETE™ cements, available from Schlumberger. DensCRETE cements have a high specific gravity and a trimodal particle size distribution (fine, medium and coarse particles). Portland cement represents the medium-size particles. The median particle sizes of the coarse and fine mineral fillers are shown in Table 6. Strength development results at 300° C. and 124.1 MPa are shown in FIG. 7.

TABLE 6

Mineral filler sizes.

| Mineral | Coarse crystalline silica | Fine crystalline silica | Coarse hematite | Fine hausmannite |
|---|---|---|---|---|
| $d_{50}$ [μm] | ~300 | 3 | ~100 | 5 |

Design [15] was a comparative system that did not contain Type F fly ash. Tobermorite did not form as a crystalline phase within the set cement. The set cement suffered a strength loss of 57% after reaching a maximum value, and the water permeability exceeded the industry limit of 0.1 mD.

Design [16] contained Type F fly ash, and both the C/S and A/S ratios were within the limits claimed in the present application. Tobermorite formed as a crystalline phase within the set cement. The unconfined compressive strength was stable, and the water permeability was acceptable.

Although a few example embodiments have been described in detail above, those skilled in the art will readily appreciate that many modifications are possible in the example embodiments without materially departing from this disclosure. Accordingly, each such modification is intended to be included within the scope of this disclosure as defined in the following claims.

The invention claimed is:

1. A method for cementing a subterranean well, comprising:
   (i) preparing a pumpable cement slurry comprising water, a single hydraulic cement consisting of portland cement, lime, a source of silica and a source of alumina, wherein the source of alumina consists of Type F fly ash;
   (ii) placing the cement slurry in the subterranean well; and
   (iii) curing the cement slurry in the subterranean well at a temperature between 850 C. and 3000 C., whereupon the cement slurry forms a set cement;
   wherein a lime-to-silica molar ratio between 0.5 and 1.0 and an alumina-to-silica molar ratio between 0.05 and 0.10 are maintained simultaneously, and an initial and permanent binding phase of the set cement is 11 A tobermorite, aluminum substituted tobermorite, or both.

2. The method of claim 1, wherein the source of silica comprises crystalline silica.

3. The method of claim 2, wherein the crystalline silica is present at a median particle size ($d_{50}$) between 3.0 μm and 400 μm.

4. The method of claim 1, wherein the silica is present at a concentration between 20% and 120% by weight of cement.

5. The method of claim 1, wherein the alumina is present at a concentration between 10% and 60% by weight of cement.

6. The method of claim 1, wherein the alumina is present at a median particle size ($d_{50}$) between 1 μm and 100 μm.

7. The method of claim 1, wherein the cement slurry further comprises iron dust, hausmannite, ilmenite, hematite, titanium dioxide, barite or calcite, or combinations thereof.

8. The method of claim 1, wherein the cement slurry further comprises petroleum coke, delayed coke, fluid coke, calcined coke, asphalt, charcoal, coal, anthracite, graphite, flake coke, amorphous pitch coke, anode coke, metallurgical coke, amorphous graphite, lignite, bituminous coal, sub-bituminous coal, exinite, vitrinite, intertinite, fine kolite, activated carbon, gilsonite, ground rubber, an aqueous inverse emulsion of particles comprising a betaine group, poly-2, 2, 1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methyl styrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers or substituted styrene acrylate copolymers, or combinations thereof.

9. The method of claim 1, wherein the cement slurry further comprises nitrogen, air or microspheres or combinations thereof.

10. The method of claim 1, wherein the cement slurry further comprises magnesium oxide.

11. The method of claim 1, wherein the cement slurry has a solid volume fraction between 20% and 60%.

12. The method of claim 1, wherein the set cement has a water permeability lower than 0.1 mD.

13. The method of claim 1, wherein the set cement has a strength that does not vary more than 30% during a 6-month curing period.

14. The method of claim 1, wherein the set cement has a compressive strength greater than 3.5 MPa.

15. A method for cementing a subterranean well, comprising:
   (i) preparing a pumpable cement slurry comprising water, a single cement consisting of portland cement, lime, a source of silica and a source of alumina;
   (ii) placing the cement slurry in the subterranean well; and
   (iii) curing the cement slurry in the subterranean well at a temperature between 85° C. and 300° C., whereupon the cement slurry forms a set cement:
   wherein a lime-to-silica molar ratio between 0.5 and 1.0 and an alumina-to-silica molar ratio between 0.05 and 0.10 are maintained simultaneously, and an initial and permanent binding phase of the set cement is 11 A tobermorite, aluminum substituted tobermorite, or both.

* * * * *